United States Patent [19]

Kusumgar

[11] Patent Number: 4,713,414

[45] Date of Patent: Dec. 15, 1987

[54] POLYOXYMETHYLENE MOLDING COMPOSITIONS EXHIBITING IMPROVED TOUGHNESS

[75] Inventor: Rajal M. Kusumgar, Livingston, N.J.

[73] Assignee: Celanese Corporation, New York, N.Y.

[21] Appl. No.: 886,274

[22] Filed: Jul. 16, 1986

[51] Int. Cl.[4] .............................................. C08L 51/00
[52] U.S. Cl. ....................................... 525/64; 525/66; 525/154; 525/902
[58] Field of Search ................. 525/64, 154, 902, 370, 525/398, 399, 66, 69

[56] References Cited

FOREIGN PATENT DOCUMENTS 0115373 8/1984 European Pat. Off. .

Primary Examiner—Theodore E. Pertilla
Attorney, Agent, or Firm—Robert M. Shaw

[57] ABSTRACT

The invention relates to polyoxymethylene molding composition exhibiting improved toughness and containing from about 50 to about 95 wt. % of a polyoxymethylene, from about 5 to about 40 wt. % of a multiphase composite interpolymer and from about 0.05 to about 5.0 wt. % of a reactive titanate, such as neoalkoxy, tri(n-ethylaminoethylamino) titanate, based on the total weight of the composition and based on 100% reactivity of the reactive titanate.

10 Claims, No Drawings

POLYOXYMETHYLENE MOLDING COMPOSITIONS EXHIBITING IMPROVED TOUGHNESS

FIELD OF THE INVENTION

This invention relates to polyoxymethylene molding compositions exhibiting improved toughness.

BACKGROUND OF THE INVENTION

The terms oxymethylene polymer and polyoxymethylene as used interchangeably herein are meant to include oxymethylene homopolymers and diethers and diesters as well as oxymethylene copolymers and terpolymers, which are oxymethylene polymers having at least 60 percent recurring oxymethylene units and at least one other unit derived from a monomer copolymerizable with the source of the oxymethylene units.

Oxymethylene polymers having recurring —CH$_2$O— units have been known for many years. They may be prepared for example, by the polymerization of anhydrous formaldehyde or by the polymerization of trioxane, which is a cyclic trimer of formaldehyde, and will vary in physical properties such as thermal stability, molecular weight, molding characteristics, color and the like depending, in part, upon their method of preparation, on the catalytic polymerization technique employed and upon the various types of comonomers which may be incorporated into the polymer.

Polyoxymethylene molding compositions have been in commercial use for many years. They have application in a wide variety of end uses, e.g., automobile applications such as bumper extensions and instrument panels, plumbing supplies such as valves, shower assemblies, flush tank components, and pipe fittings, tool components such as screw driver adaptors, and household and personal products, such as quick boiling electric water kettles, clothes hangers and combs.

Polyoxymethylenes have a highly favorable spectrum of physical properties which are responsible for their wide commercial acceptance. However for certain molding applications, e.g., exterior automobile body parts, molding compositions that impart higher than usual impact strength to articles molded from them are highly desirable.

It is known in the art to add a multi-phase composite interpolymer to a thermoplastic polymer such as a polypropylene terephthalate, a polybutylene terephthalate, a polyethylene terephthalate, a polycarbonate, a polyvinyl halide, an acrylic polymer or an oxymethylene polymer to increase the impact properties of the thermoplastic polymer. Examples of such compositions may be found in U.S. Pat. Nos. 3,843,753, 4,086,296, 4,096,202, 4,180,494 and 4,200,567, and in commonly assigned application Ser. No. 765,014, filed Aug. 9, 1985, now U.S. Pat. No. 4,665,126.

Also known in the art are polymer blends of 40 to 99% of a thermoplastic polyurethane, 1 to 60% of a thermoplastic polymer which can be a polyoxymethylene, and 0.5 to 10% of an acrylic polymer as a processing aid. The blend is stated to provide a more homogeneous melt and enhanced hot metal release and lubricity.

While these prior art compositions are useful, a polyoxymethylene molding composition exhibiting toughness would be highly desirable. The present invention provides such a composition.

SUMMARY OF THE INVENTORY

The present invention provides an oxymethylene polymer molding composition which when molded into products exhibits improved toughness. The composition comprises from about 50 to about 95 wt. % of the total composition of a normally solid oxymethylene polymer having an inherent viscosity of at least 1.0 (measured at 60° C. in a 0.1 weight percent solution in p-chlorophenol containing 2 weight percent of alpha-pinene), a molecular weight of at least 10,000 and a melting point of at least 150° C., about 0.05 to about 5 wt. % based on the total composition and based on 100% reactivity of a reactive titanate and a multiphase composite interpolymer in an amount of from about 1 to about 50 wt. % of the total composition.

DESCRIPTION OF THE PREFERRED EMBODIMENTS

The oxymethylene polymers useful in the compositions of the present invention include oxymethylene homopolymers and diethers and diesters. Also useful and generally preferred are oxymethylene copolymers, which include oxymethylene polymers having at least 60 percent recurring oxymethylene units and at least one other unit derived from a monomer copolymerizable with the source of the oxymethylene units. Further, oxymethylene terpolymers may be used as may combinations of two or more homopolymers, copolymers or terpolymers. Among the copolymers which may be used are those having a structure comprising recurring units having the formula

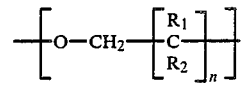

wherein each R$_1$ and R$_2$ is selected from the group consisting a hydrogen, lower alkyl and lower halogen substituted alkyl radicals and wherein n is an integer from zero to 5 and wherein n is zero in from 60 to 99.6 percent of the recurring units.

A preferred class of copolymers are those having a structure comprising recurring units having the formula (—O—CH$_2$—(CH$_2$O$_n$—) wherein n is an integer from zero to 2 and wherein n is zero in from 60 to 99.6 percent of the recurring units. These copolymers are prepared by copolymerizing trioxane with a cyclic ether having the structure

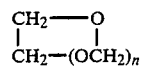

where n is an integer from zero to two.

Among the specific cyclic ethers which may be used are ethylene oxide, 1,3-dioxolane, 1,3,5-trioxepane, 1,3-dioxane, trimethylene oxide, pentamethylene oxide, 1,2-propylene oxide, 1,2-butylene oxide, neopentyl formal, pentaerythritol diformal, paraldehyde, tetrahydrofuran, and butadiene monoxide. Particularly preferred is a copolymer prepared by copolymerizing trioxane and ethylene oxide, 1,3-dioxolane or both.

High molecular weight oxymethylene polymers may be prepared in high yields and with rapid reaction rates by the use of catalysts comprising boron fluoride coordinate compounds in which oxygen or sulfur is the donor atom, as described in U.S. Pat. No. 2,986,506.

The copolymers useful in the present invention have typically and preferably been subjected to either solution hydrolysis (hereinafter "SH") or melt hydrolysis (hereinafter "MH") to remove unstable groups. These processes degrade the hemiacetal end groups in the copolymer chain. Both processes are known to those skilled in the art and are in commercial practice. A useful solution hydrolysis process is disclosed in U.S. Pat. No. 3,179,948 and a useful melt hydrolysis process is disclosed in U.S. Pat. No. 3,318,848.

Oxymethylene terpolymers useful in the present invention may be produced by the terpolymerization of trioxane with one or more of the above described cyclic ethers and the polyepoxides or diformals of British Pat. No. 1,026,777, the disclosure of which is hereby incorporated by reference. Thus, the terpolymers can be obtained by copolymerizing trioxane with the above defined cyclic ethers and with comonomers containing at least two oxygen-containing groups each of which is capable of providing an oxyalkylene group in the polymerization. Such compounds include (1) cyclic ethers having ether oxygen atoms in at least two rings, e.g., 2,2-(trimethylene)bis-1,3-dioxolane, and particularly cyclic ethers having (a) at least two epoxy rings, such as polyepoxides, e.g., diepoxides and triepoxides, (b) at least two formal rings, e.g., pentaerythritol diformal, and (c) at least one epoxy ring and at least one formal ring, e.g., monocrotylidene trimethylolethane monoepoxide; and (2) compounds having at least two oxo groups, such as dialdehydes and diketones, e.g., glutaraldehyde, terephthaldehyde and acrolein dimer.

Suitable polyepoxides include those which may be prepared by the epoxidation of compounds having two or more olefinic linkages. Diepoxides of diolefins are usually used and the epoxidized olefinic bonds may be of aliphatic or cycloaliphatic structures. Particular diepoxides which may be used include butadiene dioxide, vinyl cyclohexene dioxide (1-epoxyethyl-3,4-epoxycyclohexane), limonene dioxide, resourcinol diglycidyl ether, bis-epoxydicyclopentyl ether of ethylene glycol, dicyclopentadiene dioxide and dicrotilidene pentacrythritol diepoxide. Suitable triepoxides include triglycidyl trimethylol propane, which may be prepared by reacting the triallyl ether of trimethylol propane in a solvent with peracetic acid at a temperature of 0° to 75° C. Suitable polyepoxides include a polyepoxy glyceryl ester containing an average of 5.5 epoxy groups per molecule.

A preferred terpolymer is formed from trioxane, ethylene oxide and butanediol diglycidyl ether. The terpolymer will contain at least 95 weight percent oxymethylene units, less than 1 weight percent, and preferably 0.05 to 0.80 weight percent units derived from the polyfunctional monomer and the balance oxyalkylene units. A most preferred terpolymer will contain from 97.44 to 99.55 weight % oxymethylene units derived from trioxane, 0.4 to 2.5 weight % oxyalkylene units, and 0.05 to 0.06 weight % of the polyfunctional comonomer.

The monomers are polymerized in the presence of Lewis acid polymerization catalysts which are those known in the art for the copolymerization of trioxane with cyclic ethers. Typical of such Lewis acid polymerization catalysts are boron trifluoride, antimony trifluoride, antimony fluroborate, bismuth trifluoride, bismuth oxyfluoride, nickelous fluoride, aluminum trifluoride, titanium tetrafluoride, manganous fluoride, manganic fluoride, mercuric fluoride, silver fluoride, zinc fluoride, ammonium bifluoride, phosphorous pentafluoride, hydrogen fluoride, phosphorous trichloride, titanium tetrachloride, ferric chloride, zirconium tetrachloride, aluminum trichloride, stannic chloride and stannous chloride and compounds containing these materials such as boron trifluoride coordinate complexes with organic compounds, particularly those in which oxygen or sulfur is a donor atom such as alcohols, phenol, an acid, an ether, an acid anhydride, an ester, a ketone, an aldehyde, a dialkyl sulfide or a mercaptan.

An alternative method of forming the oxymethylene copolymers is by performing the copolymerization of trioxane with the cyclic ethers with the above Lewis acid polymerization catalyst in the presence of a small amount of a non-acidic organo tin compound having at least one direct chemical bond from a tin atom to an atom selected from the group consisting of oxygen and sulfur as set forth in U.S. Pat. No. 3,862,090.

The useful non-acidic organo tin compounds are those which contain at least one direct chemical bond from said tin atom to an atom selected from the group consisting of oxygen and sulfur. By direct chemical bond is meant that the bond from said tin atom to said oxygen or sulfur atom is one which satisfies a primary valence of said tin atom and said oxygen or sulfur atom. Thusly, organo tin compounds which do not contain such a direct chemical bond from said tin atom to said oxygen or sulfur atom, but which are coordinate complexes between said tin atom and said oxygen or sulfur atoms are not included within the definition of organo tin compounds having at least one direct chemical bond from said tin atom to an atom selected from the group consisting of oxygen and sulfur.

Typical of the non-acidic organo tin compounds which contain at least one direct chemical bond from said tin atom to an atom selected from the group consisting of oxygen and sulfur which may be used according to the instant invention are:

A. Tetravalent tin compounds:

trimethyltin acetate, di-n-butyltin diacetate, tri-n-butyltin acetate, dimethyltin maleate, di-n-butyltin maleate, di-n-butyltin dilaurate, di-n-butyltin distearate, di-n-butyltin salicylate, diethyltin dibenzoate, diethyltin bis(monolauryl phthalate), di-n-butyltin dicinnamate, di-n-butyltin oxide, di-n-butyltin oxylaurate, di-n-butyltin monomethyoxymonoacetate, di-n-butyltin dimethoxide, di-n-butyltin monoacetyl monolauryl mercaptide, di-n-butyltin bis(mono-β-hydroxyethyl maleate), di-n-butyltin bis (monoethylmaleate), di-n-butyltin monomethyoxymethyl maleate, di-n-butyltin dimethylacrylate, diethyltin bis(mono-β-hydroxyethylthioglycolate, di-n-butyltin dibutylthioglycolate, di-n-butyltin bisoctylthiopropionate, di-n-butyltin bis-β-chloroethylthioglycolate, di-n-hexyltin bis (tetrahydrofurfuryl) thioglycolate, di-n-butyltin sulphide, di-n-butyltin diepoxyoleate, di-n-butyltin dimethyldithiocarbamate, bis-tr-8-n-butyltin) oxide, bis(tributyltin) sulphide.

B. Divalent tin compounds:

stannous formate, stannous acetate, stannous propionate, stannous butyrate, stannous octoate, stannous stearate, stannous benzoate, stannous sulfide, compounds of divalent tin with 2,6-ditertiary-butylphenols or thiophenols, stannous mercaptide, stannous oxide, stannous laurate and the like.

Preferred of these nonacidic organo tin compounds are those which contain at least one direct chemical bond from the tin atom to an oxygen atom, and most preferred are the tin carboxylates.

The copolymerization of trioxane and comonomers is conducted at a temperature of from about 50° C. to about 90° C., preferably from about 60° C. to about 80° C. If the Lewis acid polymerization catalyst is used alone, it is typically used in amounts from about 20 to about 100 parts per million (ppm), preferably from about 30 to 70 (ppm) based on the weight of trioxane. If in addition to the Lewis acid polymerization catalyst, the non-acidic organo tin compounds is used, such compound is used in amounts of from about 50 to 500 (ppm), preferably from about 60 to 250 (ppm), based on the combined weights of comonomers.

The oxymethylene polymers that are modified according to this invention are thermoplastic materials having a molecular weight of at least 5,000, a melting point of at least 100° C. and an inherent viscosity of at least 0.6 (measured at 60° C. in a 0.1 weight percent solution in p-chlorophenol containing 2 weight percent of alpha-pinene), preferably they have a molecular weight of at least 10,000, a melting point of at least 150° C. and an inherent viscosity of at least 1.0 (measured at 60° C. in a 0.1 weight percent solution in p-chlorophenol containing 2 weight percent of alpha-pinene).

The multiphase composite interpolymer is present in the composition in an amount of from about 1 to about 50 wt. %, preferably from about 10 to about 40 wt. %, and more preferably from about 20 wt. % to about 30 wt. %, based on the total composition.

The multiphase composite interpolymer comprises about 25 to 95 wt. % of a first elastomeric phase and about 75 to 5 wt. % of a final rigid thermoplastic phase. One or more intermediate phases are optional, e.g., a middle stage polymerized from about 75 to 100 percent by weight of styrene may be incorporated.

Various crosslinked, elastomeric polymers may be used as the first stage of the multiphase composite interpolymer. One suitable first stage polymer is an acrylic rubber core having a $T_g$ below about 10° C. and prepared by polymerizing a monomeric composition comprising about 75 to 99.8 wt. % of a $C_1$ to $C_6$ alkyl acrylate, 0.1 to 5 wt. % of a crosslinking monomer and 0.1 to 5 wt. % of a graftlinking monomer. The preferred alkyl acrylate for this class of polymers is butyl acrylate.

The crosslinking monomer is a polyethylenically unsaturated monomer having a plurality of addition polymerizable reactive groups, all of which polymerize at substantially the same rate of reaction. Suitable crosslinking monomers include polyacrylic and methacrylic esters of polyols such as butylene diacrylate and butylene dimethacrylate, trimethylolpropane trimethacrylate, and the like; di- and trivinyl benzene, vinyl acrylate and methacrylate and the like. The preferred crosslinking monomer is butylene diacrylate.

The graftlinking monomer is a polyethylenically unsaturated monomer having a plurality of addition polymerizable reactive groups, at least one of the reactive groups polymerizing at a substantially different rate of polymerization from at least one other of said reactive groups. The function of the graftlinking monomer is to provide a residual level of unsaturation in the elastomeric phase, particularly in the latter stages of polymerization and, consequently, at or near the surface of the elastomeric particles. When the rigid thermoplastic phase is subsequently polymerized at the surface of the elastomer, the residual unsaturated addition polymerizable reactive groups contributed by the graftlinking monomer participate in the subsequent reaction so that at least a portion of the rigid phase is chemically attached to the surface of the elastomer. Among the effective graftlinking monomers are allyl groups containing monomers such as allyl esters of ethylenically unsaturated acids, e.g., allyl acrylate, allyl acid maleate, allyl acid fumarate and allyl acid itaconate. Somewhat less preferred are the diallyl esters of polycarboxylic acids which do not contain polymerizable unsaturation. The preferred graftlinking monomers are allyl methacrylate and diallyl maleate.

Another suitable class of first stage polymers is the "MBS" polymers, made by polymerizing a monomeric mixture comprising, for example, about 50 to 85 wt. % of butadiene, about 5 to 25 wt. % of styrene and about 10 to 30 wt. % of methyl methacrylate. Due to the nature of butadiene polymerization, these polymers contain residual unsaturation which makes them susceptible to being lightly crosslinked in accordance with techniques well-known in the art, in order to obtain and maintain elasticity. Even after crosslinking, these polymers still contain some unsaturation which enables them to be graftlinked to the final rigid thermoplastic phase, as described previously.

The final stage can be polymerized from a monomer system comprising $C_1$ to $C_{16}$ methacrylates, styrene, acrylonitrile, alkyl acrylates, allyl methacrylate, diallyl methacrylate, and the like, as long as the overall $T_g$ is at least 20° C. Preferably the final stage monomer system is at least 50 wt. % of a $C_1$ to $C_4$ alkyl acrylate. It is further preferred that the final stage polymer be free of moieties which tend to degrade polyoxymethylenes, for example, an acid moiety.

A most preferred interpolymer has only two stages. The first stage, about 60 to 95 wt. % of the interpolymer, is polymerized from a monomer system comprising 95 to 99.8 wt. % butyl acrylate, 0.1 to 2.5 wt. % butylene diacrylate as the crosslinking agent and 0.1 to 2.5 wt. % allyl methacrylate or diallyl maleate as the graftlinking monomer. The final stage of the interpolymer is polymerized from about 5 to 40 wt. % methyl methacrylate. The most preferred multiphase composite interpolymer is of this type and is commercially available from Rohm and Haas and is designated as Acryloid KM-330.

The reactive titanate is present in an amount of from about 0.05 to about 5 wt. %, preferably from about 0.5 to about 2 wt. %, and more preferably from about 0.2 to about 1.0 wt. %, based on the total composition and based on 100% reactivity of the titanate. If a reactive titanate compound is used that contains a diluent, more of the compound will have to be added.

The reactive titanates useful in the present invention are multifunctional organo titanates. Preferably the reactive titanate is selected from the group consisting of neoalkoxy, trineodecanoyl titanate, neoalkoxy, dodecylbenzenesulfonyl titanate, neoalkoxy, tri(dioctylphosphato) titanate, neoalkoxy, tri(dioctylpyrophosphato) titanate, neoalkoxy, tri(n-ethylaminoethylamino) titanate, and neoalkoxy, tri(m-amino)phenyl titanate. Particularly preferred is neoalkoxy, tri(n-ethylamino ethylamino) titanate. Suitable reactive titanates of the type preferred are commercially available from Kenrich Petro Chemicals, Inc., 140 East 22nd Street, P. O. Box 32, Bayonne, N.J. 07002-0032.

The reactive titanate and multiphase composite interpolymer are intimately blended with the oxymethylene polymer by any convenient technique known to those skilled in the art which is capable of producing a substantially uniform dispersion of the particles throughout the polymer matrix. Preferably, in the blending or compounding process the shear rate employed should be below 5000 sec.$^{-1}$. In a preferred technique, the compounding is accomplished by the use of a Johnson 2½" single screw extruder at approximately 190° to 200° C. The range of shear rate of this extruder is approximately 0–3000 sec.$^{-1}$. It has been found that high shear mixing is detrimental in the process since the spherical particle structure of the multiphase interpolymer can be destroyed and the desired impact modification and processibility are not achieved.

The three components are selected such that the total of the weight percentages for each component, based on the weight of the total composition, equals 100%.

The compositions of the present invention may also include, in addition to the multiphase composite interpolymer, another impact modifier such as ABS polymer or a thermoplastic polyurethane such as those disclosed in pending application Ser. No. 625,954 filed June 29, 1984, now abandoned in an amount of from about 1 to about 50 wt. %, based on the total composition. Preferably, the polyurethane is the reaction product of:

(i) 4,4'-methylenebis (phenyl isocyanate),
(ii) polyoxytetramethylene glycol having a molecular weight within the range of about 1500 to about 3000, and
(iii) at least one diol extender selected from the group consisting of aliphatic straight chain diols having from 2 to about 6 carbon atoms, bis(2-hydroxyethyl) ether of hydroquinone, and bis(2-hydroxyethyl) ether of resocinol, said diol extender being used in the reaction within the amount of about 0.5 to about 2.5 equivalents of extender per equivalent of said polyoxytetramethylene glycol, and said phenyl isocyanate being used in the reaction in an amount such that the ratio of isocyanate groups to total hydroxyl groups is within the range of about 1.0:1.0 to about 1.08:1.0.

The oxymethlene polymer compositions also include, if desired, plasticizers, pigments, lubricants and stabilizers, e.g., stabilizers against thermal or ultraviolet degradation or both, e.g., 1,6-hexamethylene bis-(3,5-di-t-butyl-4-hydroxyhydrocinnamate), 2,2'-dihydroxy-4,4'-dimethoxy-benzophenone; 2-hydroxy-4-methoxy-benzophenone; 2-hydroxy-4-methoxy-4'-chlorobenzophenone; acid scavengers, e.g., cyanoguanidine; nucleants, UV screens and absorbers, polyamides, metal soaps, polymeric substances such as ethylene vinyl acetate, and color pigments which are compatible with oxymethylene polymers, e.g., red pigments such as azo dye and cadmium sulfide-cadmium selenide reds and "Mercadium" reds, blue pigments such as phthalocyanine blues, green pigments such as chromium oxide greens, white pigments such as titanium dioxide whites, and black pigments such as carbon blacks which can be incorporated in amounts of up to about 1% by weight in total, based upon the weight of the oxymethylene polymer. Fillers such as glass fiber may also be added in conventional amounts.

EXAMPLES

The following examples present illustrative but non-limiting embodiments of the present invention. Unless otherwise stated, the oxymethylene polymers used in the following examples are oxymethylene copolymers of trioxane and ethylene oxide which were prepared as described in Example 1 of U.S. Pat. No. 3,254,053. Catalyst residues in the polymer were deactivated with an amine as described in U.S. Pat. No. 2,989,509, and the copolymers were then subjected to hydrolysis to remove unstable terminal units as described in U.S. Pat. No. 3,318,848 or U.S. Pat. No. 3,174,948.

The various analyses referred to in the examples were conducted as described in the following procedures:

(a) Notched Izod Impact Strength, ⅛" bar, ASTM D256,
(b) Flexural Modulus and Strength, ⅛" bar, ASTM D790,0000
(c) Tensile Strength, ASTM D638,
(d) Gardner Impact Strength, 2"×⅛" discs, ASTM D3209,
(e) Dynatup instrumented impact testing: 2"×⅛" discs,
(f) Tensile Strength at yield, ⅛" bar, ASTM D638,
(g) Elongation at Break, ⅛" bar, ASTM D638.

EXAMPLE 1

Compositions A, B, C and D were prepared by mixing the components in the amounts indicated in Table 1 in a Henschel mixer, a mixer manufactured by Prodex and by Thyssen, and then extruding the mixture using either a 28mm twin screw ZSK, manufactured by Werner and Pfleiderer, or a 2½" Johnson single screw extruder, manufactured by Johnson Extruders, also as indicated in Table I below. The indicated analyses were conducted on the appropriate test bars or discs, as called for in the above-referenced test procedures, and the results are summarized below in Table II.

As shown by the data in Table II, the Gardner impact strength of comparative composition A made on the twin screw extruder is lower than that for comparative composition C made on the single screw extruder. This is probably due to high shear generated in the twin screw extruder which, it is believed, breaks down the multiphase composite interpolymer, forms acrylic acid and degrades the oxymethylene polymer. This breakdown, however, is extremely advantageous in the presence of the reactive titanate as evidenced by twin screw produced Composition B which provides substantially higher toughness in the Gardner as well as Dynatup testing compared to the single screw produced Composition D. The color of these two products are also different; darker for twin screw produced vs. lighter for single screw produced, indicating that there is a time-/temperature effect which ultimately controls the reaction and thereby the impact improvement.

TABLE I

| Composition | Wt. % Polyoxymethylene[?] | Wt. % Multiphase Composite Interpolymer[2] | Wt. % Reactive Titanate[3] | Type of Extruder |
|---|---|---|---|---|
| A[1] | 80 | 20 | 0 | Twin Screw |
| B | 79.8 | 20 | 0.2 | Twin Screw |
| C[1] | 80 | 20 | 0 | Single Screw |
| D | 79.8 | 20 | 0.2 | Single Screw |
| E | 79.8 | 20 | 0.2[4] | Twin Screw |

[1]Comparative.
[2]Acryloid KM-330, manufactured by Rohm & Haas Company, Philadelphia, Pennsylvania.
[3]LICA 44, manufactured by Kenrich Petrochemicals, Inc., Bayonne, NJ.
[4]LICA 01, manufactured by Kenrich Petrochemicals, Inc., Bayonne, NJ

TABLE II

| TEST | COMPOSITION | | | | |
|---|---|---|---|---|---|
| | A[3] | B | C[3] | D | E |
| Tensile Strength at Yield, psi | 5,100 | 5,300 | * | * | 5,000 |
| Elongation at Break, % | 57 | 91 | * | * | 103 |
| Tensile Modulus, psi × $10^6$ | 0.24 | 0.25 | * | * | 0.22 |
| Notched Izod, Ft. Lbs./In. | 2.1 | 2.3 | * | * | 2.0 |
| Gardner Impact, In. Lbs.[1] | 12 | 265 | 52 | 145 | 50 |
| Dynatup Total Energy, Ft. Lbs.[2] | 1.3 | 14.4 | 3.5 | 8.3 | 2.5 |

[1] Average of 20 discs.
[2] Average of 10 discs.
[3] Comparative
*Not measured.

I claim:

1. An oxymethylene polymer molding composition comprising a normally solid oxymethylene polymer having an inherent viscosity of at least 1.0 (measured at 60° C. in a 0.1 weight percent solution in p-chlorophenol containing 2 wt. % of alpha-pinene), a molecular weight of at least 10,000 and a melting point of at least 150° C., in an amount of from about 50 to about 95 wt. %, based on the weight of the total composition, a reactive titanate selected from the group consisting of neoalkoxy, trineodecanoyl titanate, neoalkoxy, dodecylbenzene-sulfonyl titanate, neoalkoxy, tri(dioctylphosphato) titanate, neoalkoxy, tri(dioctylpyrophosphato) titanate, neoalkoxy, tri(N-ethylaminoethylamino) titanate, and neoalkoxy, tri(m-amino) phenyl titanate, and present in an amount of from about 0.05 to about 5 wt %, based on the weight of the total composition and based on 100% reactivity of the titanate, and a multiphase composite interpolymer in an amount of from about 1 to about 50 wt. %, based on the weight of the total composition.

2. The composition of claim 1 wherein the multiphase composite interpolymer comprises
   (a) about 25 to 95 wt. % of a first elastomeric phase polymerized from a monomer system comprising about 75 to 99.8% wt. % $C_1$ to $C_6$ alkyl acrylate, 0.1 to 5 wt. % crosslinking monomer, 0.1 to 5% by weight graftlinking monomer, said crosslinking monomer being a polyethylenically unsaturated monomer having a plurality of addition polymerizable reactive groups all of which polymerize at substantially the same rate of reaction, and said graftlinking monomer being a polyethylenically unsaturated monomer having a plurality of addition polymerizable reactive groups, at least one of which polymerizes at a substantially different rate of polymerization from at least one other of said reactive groups; and,
   (b) about 75 to 5 weight percent of a final, rigid thermoplastic phase polymerized in the presence of said elastomeric phase.

3. The composition of claim 1 wherein the multiphase composite interpolymer is present in an amount of from about 1 to about 50 wt. %, based on the weight of the total composition.

4. The composition of claim 1 wherein the multiphase composite interpolymer has only two stages, the first stage comprising about 60 to 95% by weight of said interpolymer and said first stage is polymerized from a monomer system comprising 95 to 99.8% by weight butyl acrylate, 0.1 to 2.5% by weight butylene diacrylate as a crosslinking agent, 0.1 to 2.5% by weight allyl methacrylate or diallyl maleate as a graftlinking agent, and said final stage is polymerized from about 5 to 40% by weight methyl methacrylate.

5. The composition of claim 1 wherein the amount of reactive titanate ranges from about 0.05 to about 2 wt. %.

6. The composition of claim 1 wherein the reactive titanate is neoalkoxy, tri(N-ethylaminoethylamino) titanate.

7. The composition of claim 1 wherein the oxymethylene polymer is a capped homopolymer.

8. The composition of claim 1 wherein the oxymethylene polymer is an oxymethylene copolymer comprising from about 85 mole percent to 99.9 mole percent recurring —$OCH_2$— groups.

9. The composition of claim 1 including a thermoplastic polyurethane in an amount of from about 1 to about 50 wt. %, based on the weight of the total composition.

10. The composition of claim 9 wherein the thermoplastic polyurethane is the reaction product of:
    (i) 4,4'-methylenebis (phenyl isocyanate),
    (ii) polyoxytetramethylene glycol having a molecular weight within the range of about 1500 to about 3000, and
    (iii) at least one diol extender elected from the group consisting of aliphatic straight chain diols having from 2 to about 6 carbon atoms, bis(2-hydroxyethyl) ether of hydroquinone, and bis(2-hydroxyethyl) ether of resorcinol,
said diol extender being used in the reaction within the amount of about 0.5 to about 2.5 equivalents of extender per equivalent of said polyoxytetramethylene glycol, and said phenyl isocyanate being used in the reaction in an amount such that the ratio of isocyanate groups to total hydroxyl groups is within the range of about 1.0:1.0 to about 1.08:1.0.

* * * * *